United States Patent
Pearson

(10) Patent No.: US 10,830,219 B2
(45) Date of Patent: Nov. 10, 2020

(54) MOVEABLE JOINT

(71) Applicant: UNITED KINGDOM RESEARCH AND INNOVATION, Swindon (GB)

(72) Inventor: David Pearson, Edinburgh (GB)

(73) Assignee: THE SCIENCE AND TECHNOLOGY FACILITIES COUNCIL, Swindon (GB)

( * ) Notice: Subject to any disclaimer, the term of this patent is extended or adjusted under 35 U.S.C. 154(b) by 0 days.

(21) Appl. No.: 16/335,466

(22) PCT Filed: Sep. 6, 2017

(86) PCT No.: PCT/GB2017/052589
§ 371 (c)(1),
(2) Date: Mar. 21, 2019

(87) PCT Pub. No.: WO2018/055330
PCT Pub. Date: Mar. 29, 2018

(65) Prior Publication Data
US 2019/0234385 A1    Aug. 1, 2019

(30) Foreign Application Priority Data
Sep. 21, 2016   (GB) .................................. 1616073.1

(51) Int. Cl.
*F03G 7/06* (2006.01)
*F16F 1/12* (2006.01)
*F16F 3/02* (2006.01)

(52) U.S. Cl.
CPC .............. *F03G 7/065* (2013.01); *F16F 1/121* (2013.01); *F16F 3/02* (2013.01); *F16F 2224/0258* (2013.01)

(58) Field of Classification Search
CPC ..... F03G 7/065; F16F 3/02; F16F 2224/0258; F16F 1/121
See application file for complete search history.

(56) References Cited

U.S. PATENT DOCUMENTS

| | | | |
|---|---|---|---|
| 6,374,608 B1 * | 4/2002 | Corris | F03G 7/065 60/527 |
| 7,017,345 B2 * | 3/2006 | Von Behrens | F03G 7/065 60/527 |

(Continued)

FOREIGN PATENT DOCUMENTS

| | | |
|---|---|---|
| DE | 102010025142 A1 | 12/2011 |
| EP | 1498647 A1 | 1/2005 |

(Continued)

OTHER PUBLICATIONS

UK Intellectual Property Office; UK Search Report under Section 17(5); dated Feb. 9, 2017; pp. 1-3.

*Primary Examiner* — Shafiq Mian
(74) *Attorney, Agent, or Firm* — Taft Stettinius & Hollister LLP; Stephen F. Rost

(57) ABSTRACT

A moveable joint including a first member and a second member moveably connected to the first member, a shape-memory-alloy member coupled to the first member and engageable with the second member, and a biasing member configured to bias the second member from a first position relative to the first member towards a second position relative to the first member. Movement of the second member between the first position and the second position is limited by the shape-memory-alloy member such that the position of the second member relative to the first member is determined by the shape of the shape-memory-alloy member.

20 Claims, 4 Drawing Sheets

(56) References Cited

U.S. PATENT DOCUMENTS

| | | | |
|---|---|---|---|
| 2007/0277877 A1* | 12/2007 | Ghorbal | F16K 31/002 137/67 |
| 2009/0212158 A1* | 8/2009 | Mabe | B64C 9/323 244/1 N |
| 2012/0187143 A1 | 7/2012 | Weber et al. | |
| 2013/0082427 A1 | 4/2013 | Zavattieri et al. | |
| 2013/0199172 A1* | 8/2013 | Strom | B23P 11/005 60/527 |

FOREIGN PATENT DOCUMENTS

| | | |
|---|---|---|
| GB | 2450793 A | 1/2009 |
| JP | S59211773 A | 11/1984 |
| WO | 03093615 A1 | 11/2003 |
| WO | 2010142452 A1 | 12/2010 |

* cited by examiner

MOVEABLE JOINT

This application is a U.S. national stage application under 35 U.S.C. § 371 of PCT International Application Serial No. PCT/GB2017/052589 which has an international filing date of Sep. 6, 2017, designates the United States of America, and claims the benefit of GB Application No. 1616073.1, which was filed on Sep. 21, 2016. The disclosures of each of these prior applications are hereby expressly incorporated by reference in their entirety.

This invention relates to a moveable joint for use in space applications. Particularly, this invention relates to a moveable joint having a biasing force and a shape-memory-alloy member to limit the biasing force.

BACKGROUND

Smaller satellites such as "CubeSats" are becoming increasingly popular due to their low mass and consequent lower cost. Smaller satellites are typically used for experiments or to demonstrate spacecraft technologies where the cost of a larger satellite cannot be justified. It is known that one or more panels may be extended from a smaller satellite once in orbit to increase the surface area available, and this is particularly useful for optical equipment or for harnessing solar energy to provide power to the satellite.

In certain prior art arrangements, a panel may be attached to a satellite via a hinge, and a torsion spring may provide the force required to deploy the panel. The spring force is typically restrained by a wire with a relatively low melting point. To deploy the panel, the wire is melted to permit the spring force to pivot the panel until it reaches a fixed pre-determined position. In other prior art arrangements, a shape-memory-alloy (SMA) wire is used to block a torsion spring force from actuating a hinge. When heated above a certain temperature, the SMA wire changes shape such that it contracts to unblock the torsion spring force. When unblocked and thus unrestricted by the SMA wire, the torsion spring is free to rotate the hinge to a fixed pre-determined position.

In certain prior art arrangements, the panel position may not be adjustable after it has been deployed, or adjustability may be limited or require complex mechanisms. For example, a panel designed to harness solar energy may not be able to harness the optimum amount of solar energy available. Further, lubrication of a mechanical hinge in space is difficult due to space being a vacuum, and lubricants may be affected by the extreme temperatures experienced in space. If lubrication is not present then continuing oscillations following release of the spring force can cause damage to the satellite.

It is an object of certain embodiments of the present invention to address the above-described disadvantages associated with the prior art.

BRIEF SUMMARY OF THE DISCLOSURE

In accordance with an aspect of the present invention there is provided a moveable joint comprising:
  a first member;
  a second member moveably connected to the first member;
  a shape-memory-alloy member connected to the first member and engageable with the second member, the shape-memory-alloy member being configured to change shape when heated; and
  a biasing means configured to bias the second member from a first position relative to the first member towards a second position relative to the first member;
  wherein movement of the second member between the first position and the second position is limited by the shape-memory-alloy member such that the position of the second member relative to the first member is determined by the shape of the shape-memory-alloy member.

In certain embodiments, intermediate of the first position and the second position, the position of the second member relative to the first member may be determined by the shape of the shape-memory-alloy member.

In certain embodiments, the second member may be rotatable about the first member. In some embodiments, the second member may be hingedly connected to the first member. The second member may comprise a shaft receivable by the first member such that the second member is hingedly rotatable relative to the first member. The first member may comprise one or more v-shaped grooves configured to receive the shaft of the second member. The v-shaped grooves may be at opposing ends of the first member.

In certain embodiments, the first member may be configured to adjust the position of the second member. The first member may comprise a flexible material such that the shape of the first member is adjustable.

In certain embodiments, opposing ends of the first member may be moveable relative to a centre of the first member such that the v-shaped groove at opposing ends of the first member is configured to adjust the position of the second member relative to the centre of the first member.

In certain embodiments, the shape-memory-alloy member may be deformable from its original shape such that when the shape-memory-alloy member is in a deformed shape, the second member is in the first position relative to the first member, and when the shape-memory-alloy member is in its original shape, the second member is in the second position relative to the first member. When the shape-memory-alloy member is in its original shape, the second member may be moveable relative to the shape-memory-alloy member.

In certain embodiments, the moveable joint may comprise a heating means configured to heat the shape-memory-alloy member such to change its shape. The heating means may extend substantially along the length of the shape-memory-alloy member. The heating means may comprise a wire. The wire may comprise a constantan wire.

In certain embodiments, the biasing means may comprise a spring. The spring may comprise a torsion spring.

In certain embodiments, the shape-memory-alloy member may comprise a one-way shape-memory-alloy. The shape-memory-alloy member may comprise nitinol.

In accordance with an aspect of the present invention there is provided a satellite comprising a moveable joint according to the above aspect of the invention. The second member of the moveable joint may comprise a mirror.

BRIEF DESCRIPTION OF THE DRAWINGS

Embodiments of the invention are further described hereinafter with reference to the accompanying drawings, in which.

DETAILED DESCRIPTION

Figure 1:
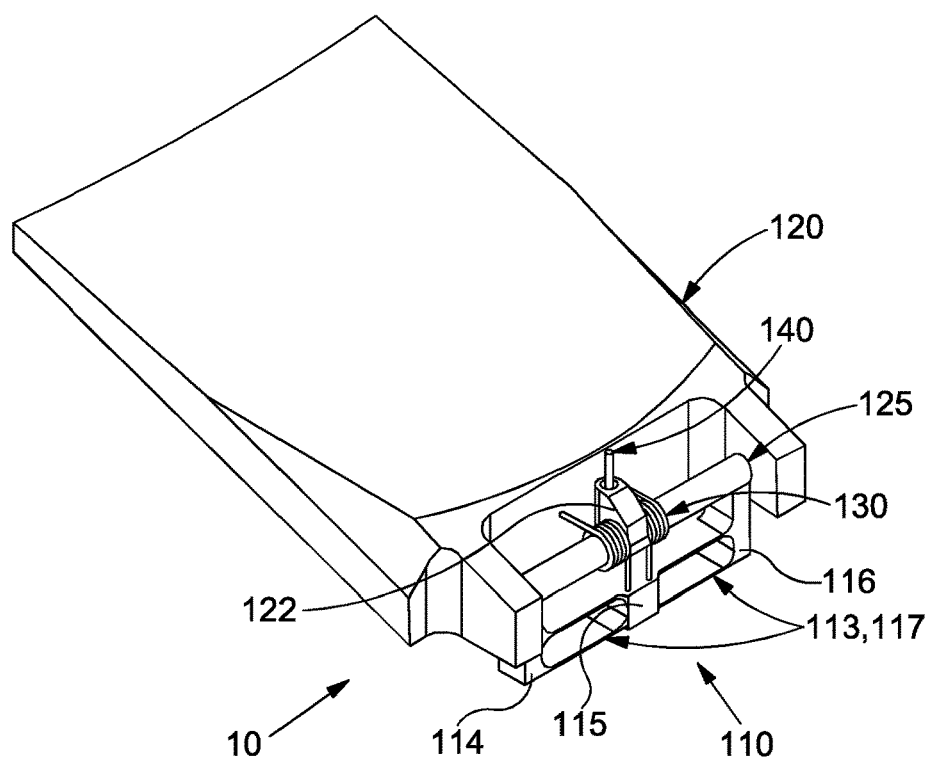
FIG. 1 is a schematic view of a moveable joint in accordance with an embodiment of the present invention.

A moveable joint 10 in accordance with an embodiment of the present invention is shown in FIG. 1 in a deployed configuration. The moveable joint 10 includes a first member 110, a second member 120 rotatably coupled to a first member 110, at least one torsion spring 130 coupled at a first end to the first member 110 and at a second end to the second member 120, and a shape-memory-alloy (SMA) member 140 coupled to the first member 110 and engageable with the second member 120.

A shape-memory-alloy (SMA) is an alloy that returns to an original shape (e.g. a shape set annealed condition) from a deformed shape upon being heated above a transition temperature. As such, an SMA may be deformed from its original shape, and will remain in a deformed shape until heat is applied above a transition temperature to change the shape of the SMA from the deformed shape back to the original shape.

The second member 120 includes a shaft 125 configured to be received by the first member 110, and a receiving portion 122 having a bore 122a configured to receive at least a portion of the SMA member 140 such that the SMA member 140 may pass through the bore 122a unrestricted. As such, the receiving portion 122 and thus the second member 120 may move relative to the SMA member 140 in a direction substantially parallel to the bore 122a.

Figure 2:
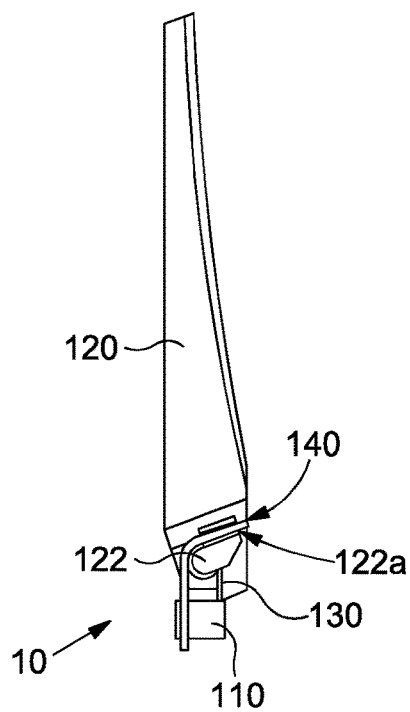
FIG. 2 is a cross-sectional side view of the moveable joint of FIG. 1 in a retracted configuration.

FIG. 2 is a cross-sectional side view of the moveable joint 10 of FIG. 1 in a retracted configuration whereby the SMA member 140 is in a deformed shape relative to its original shape. In use, the SMA member 140 may be heated to change shape from the deformed shape shown in FIG. 2 to its original shape shown in FIG. 3. In the retracted configuration shown in FIG. 2, the second member 120 is in a retracted position relative to the first member 110, and the torsion spring 130 has a stored elastic energy providing a biasing force configured to bias the second member 120 towards the deployed position shown in FIG. 3. As a consequence of the biasing force provided by the torsion spring 130, an internal surface of the bore 122a of the receiving portion 122 abuts against the SMA member 140 when the moveable joint 10 is in the retracted configuration. The biasing force provided by the torsion spring 130 is less than the force required to overcome the bending stiffness of the SMA member 140, and consequently the second member 120 is limited to the retracted position by the SMA member 140. As such, the shape of the SMA member 140 determines the position of the second member 120 relative to the first member 110 in spite of the biasing force provided by the torsion spring 130.

In use, heating the SMA member 140 to change its shape may permit the biasing force provided by the torsion spring 130 to rotate the second member 120 about the shaft 125 relative to the first member 110.

Figure 3:
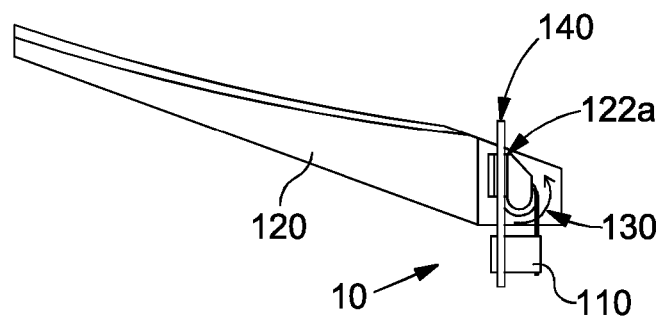
FIG. 3 shows the moveable joint of FIG. 2 in a deployed configuration.

FIG. 3 shows the moveable joint 10 of FIG. 2 in a deployed configuration. In the deployed configuration, the SMA member 140 is in its original shape, the second member 120 is in a deployed position relative to the first member 110 and the torsion spring 130 has no stored elastic energy. In alternative embodiments, the torsion spring 130 may have some residual stored elastic energy in the deployed configuration.

During movement of the second member 120 between the retracted position shown in FIG. 2 and the deployed position shown in FIG. 3, the SMA member 140 damps the biasing force provided by the torsion spring 130. Thus, the torsion spring 130 and SMA member 140 combined provide a steady rate of movement of the second member 120 between the retracted position and the deployed position. As such, in a position intermediate of the retracted position and the deployed position, the position of the second member 120 relative to the first member 110 is determined by the SMA member 140. Such damping provided by the SMA member 140 may advantageously reduce or prevent undesired vibration caused by the release of the stored energy within the torsion spring 130.

In certain embodiments, the moveable joint 10 may include one or more SMA members to determine the position of the second member 120 relative to the first member 110. However, it may be advantageous for there to be only one SMA member so that there is no requirement for the SMA member to synchronise its movement with any other SMA members when heat is applied to change the shape of the SMA member.

In alternative embodiments, the SMA member 140 may be engageable with the second member 120 by any suitable means such that movement of the second member 120 between a first position relative to the first member 110 and a second position relative to the first member 110 is limited by the SMA member 140, whereby the position of the second member 120 relative to the first member 110 is determined by the shape of the SMA member 140. For example, the SMA member 140 may abut against a portion of the second member 120.

Figure 4:
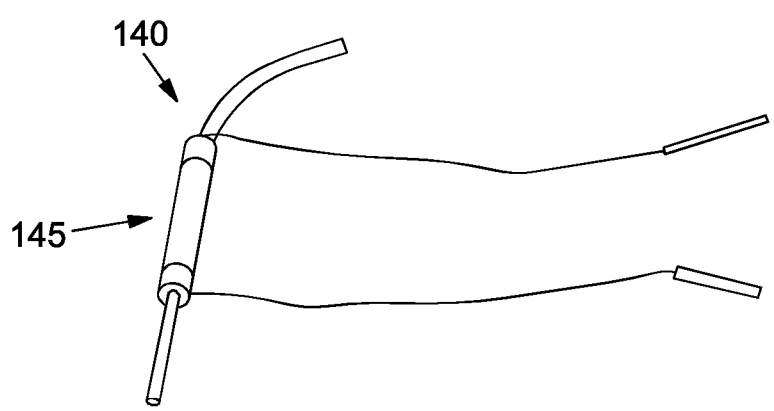
FIG. 4 is a schematic view of a shape-memory-alloy member with heating means according to an embodiment of the present invention.

FIG. 4 is a schematic view of the SMA member 140 having a heating means 145 according to an embodiment of the present invention. The heating means 145 comprises a constantan wire configured to transfer heat to the SMA member 140 to change the shape of the SMA member 140 from the deformed shape shown in FIG. 2 to the original shape shown in FIG. 3. The heating means 145 is wrapped around the SMA member 140 and extends along a substantial length of the SMA member 140. By having the heating means extending along a length of the SMA member 140, an even heat distribution is applied to the SMA member 140 to ensure an optimum transition between the retracted configuration shown in FIG. 2 and the deployed configuration shown in FIG. 3. Indeed, in certain embodiments, the heating means 145 may only apply heat to one end or both ends of the SMA member 140. In alternative embodiments, the heating means may comprise any suitable method of applying heat to the SMA member 140 to change its shape.

Figure 5:
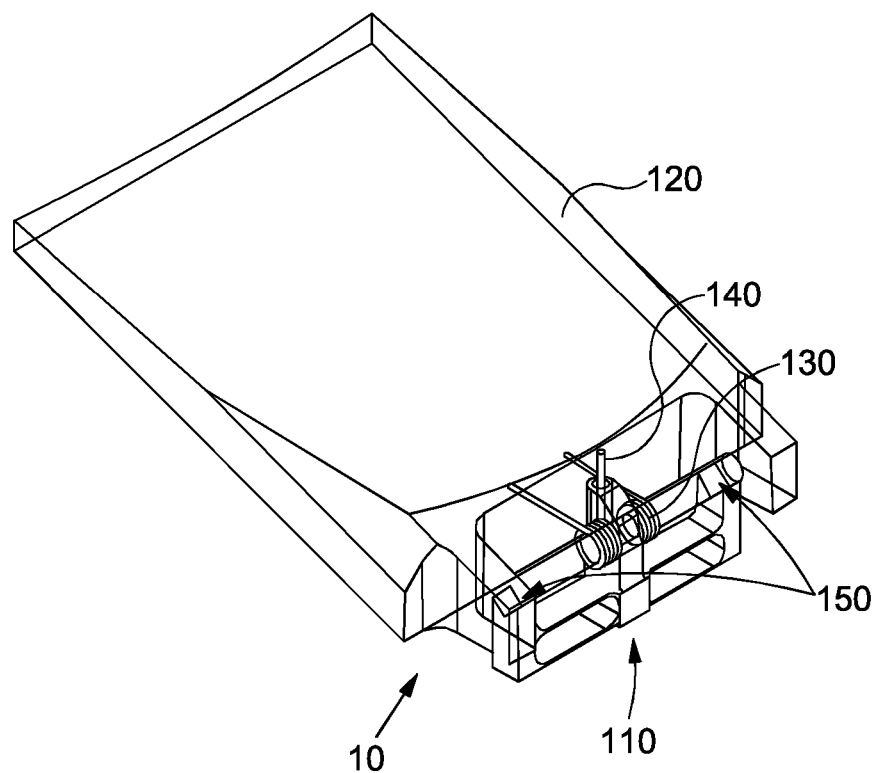
FIG. 5 is a semi-transparent view corresponding to FIG. 1.

FIG. 5 is a semi-transparent view of the moveable joint 10 of FIG. 1. The first member 110 includes a first end portion 114 and a second end portion 116 whereby the end portions 114,116 are configured to receive the shaft 125 of the second member 120. The first end portion 114 and the second end portion 116 each include a v-shaped groove 150 configured to receive the shaft 125. The first member 110 further includes a shaft restraint (not shown) configured to restrain the shaft 125 against each v-shaped groove 150 whilst permitting the shaft 125 to rotate relative to the v-shaped groove 150. In alternative embodiments, the shaft 125 may be received by the first member 110 via any means suitable for permitting rotation of the shaft 125 relative to the first member 110. For example each of the first end portion 114 and the second end portion 116 may include a semi-circular groove or a rectangular groove. In certain embodiments, there may be one, two or more grooves configured to receive the shaft 125.

Figure 6:
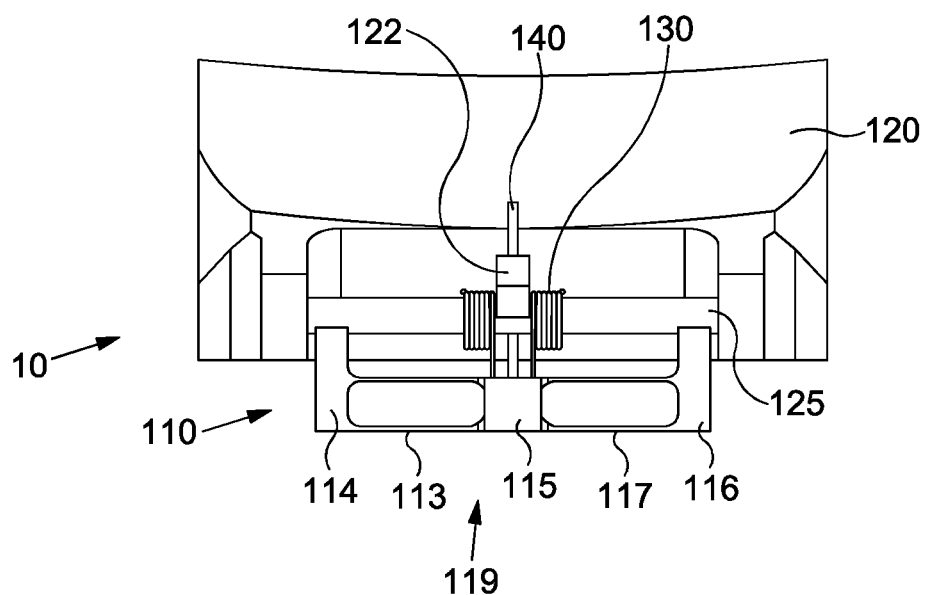
FIG. 6 is a front view corresponding to FIG. 1.

FIG. 6 is a front view of the moveable joint 10 of FIG. 1. The first member 110 further includes a central portion 115 configured to be fixed to a third member (not shown). The first end portion 114 of the first member 110 is coupled to the central portion 115 by a first flexible arm 113, and the second end portion 116 is coupled to the central portion 115 by a second flexible arm 117. The first end portion 114 and second end portion 116 are configured to be moveable relative to the central portion 115 via flexing of the first flexible arm 113 and second flexible arm 117 respectively. In use, a force may be applied to either or both the first end portion 114 and second end portion 116 in the direction of arrow 119 such that the first end portion 114 and/or second end portion 116 move in the direction of arrow 119. The force may be applied using linear actuators configured to apply a force in the direction of arrow 119.

As the shaft 125 is received by the v-shaped groove 150 of the first end portion 114 and second end portion 116, movement of either or both of the first end portion 114 and second end portion 116 may adjust the position of the shaft 125 (and thus the second member 120) relative to the central portion 115. The v-shaped groove 150 defines two specific points of contact between the shaft 125 and the first member 110 which may advantageously improve the accuracy of adjustments to the position of the shaft 125 relative to the central portion 115 of the first member 110. Consequently, the position of the second member 120 relative to the central portion 115 of the first member 110 may advantageously be adjusted when the moveable joint 10 is in the deployed configuration as shown in FIGS. 1, 3, 5 and 6.

The moveable joint 10 may advantageously operate without any lubrication, which makes the moveable joint 10 particularly suitable for application in micro-gravity or vacuum environments such as space.

In alternative embodiments, the first member 110 may comprise any means suitable for adjusting the position of the shaft 125 relative to a portion of the first member 110. For example, the first member may comprise two or more modules whereby one module may move relative to a fixed module to adjust the position of the shaft 125 relative to the fixed module.

In the embodiment shown in FIGS. 1 to 7, the SMA member 140 comprises a rod which, as shown in FIG. 3, is straight in its original, pre-deformed shape. In alternative embodiments, the SMA member may have any shape suitable such that the SMA member may engageably determine the position of the second member relative to the first member and provide damping to the biasing force provided by the torsion spring 130 during movement of the second member 120 relative to the first member 110. For example, the SMA member may be a beam or a bar.

In certain embodiments, the SMA member 140 may comprise a one-way shape-memory-alloy. In certain embodiments, the SMA member 140 comprises a nitinol rod.

In certain embodiments, the first member 110 may include a shaft configured to be received by the second member 120 such that the second member 120 is rotatable about the shaft of the first member 110.

In alternative embodiments, the second member may be extendably connected to the first member whereby, in a retracted configuration, a biasing force is configured to extend the second member away from the first member. As the SMA member determines the position of the second member relative to the first member, the SMA member may change shape such to permit extension of the second member away from the first member and may provide damping to the biasing force during movement of the second member relative to the first member.

In certain embodiments, the at least one torsion spring described above may be replaced with any suitable spring or springs. For example one or more compression springs may be used to provide a biasing force in certain embodiments. In alternative embodiments, the moveable 10 joint may comprise any biasing means suitable for biasing the second member 120 relative to the first member 110.

Figure 7:
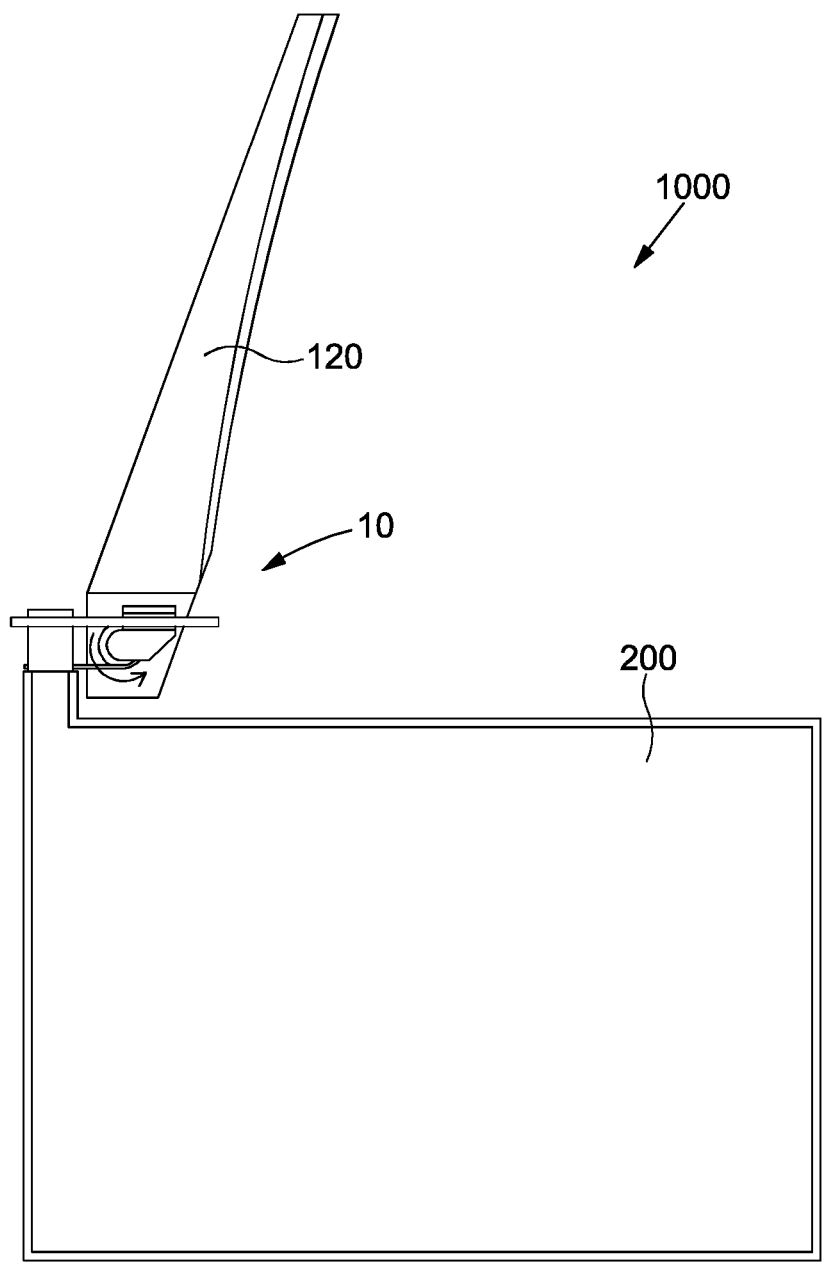
FIG. 7 is a schematic view of a satellite according to an embodiment of the present invention.

FIG. 7 shows a satellite 1000 according to an embodiment of the present invention. The satellite 1000 includes a satellite body 200 and a moveable joint 10 according to the above described embodiments attached to the satellite body. In any embodiment, the second member 120 may be any member that there is a desire to move relative to another member. In particularly preferable embodiments, the second member may be a mirror or solar panel.

Moveable joints 10 according to embodiments of the present invention may be particularly suited to CubeSat satellites.

In certain embodiments, the satellite may comprise multiple moveable joints configured to permit the deployment of multiple second members (e.g. mirrors or solar panels).

In other embodiments, the moveable joint 10 may be used for any suitable application where one member is moved relative to another, and particularly where damped movement of the member is desired.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A moveable joint comprising:
   a first member;
   a second member moveably connected to the first member;
   a shape-memory-alloy member connected to the first member and engageable with the second member, the shape-memory-alloy member being configured to change shape when heated; and
   a biasing means configured to bias the second member from a first position relative to the first member towards a second position relative to the first member;
   wherein movement of the second member between the first position and the second position is limited by the shape-memory-alloy member such that the position of the second member relative to the first member is determined by the shape of the shape-memory-alloy member;
   wherein when the shape-memory-alloy member is in a deformed shape, the second member is in the first position relative to the first member, and when the shape-memory-alloy member is energized to return to its original shape, the second member moves to the second position relative to the first member; and
   wherein when the shape-memory-alloy member is in its original shape, the second member is moveable relative to the shape-memory-alloy member.

2. A moveable joint according to claim 1, wherein, intermediate of the first position and the second position, the position of the second member relative to the first member is determined by the shape of the shape-memory-alloy member.

3. A moveable joint according to claim 1, wherein the second member is rotatable about the first member.

4. A moveable joint according to claim 3, wherein the second member is hingedly connected to the first member.

5. A moveable joint according to claim 4, wherein the second member comprises a shaft receivable by the first member such that the second member is hingedly rotatable relative to the first member.

6. A moveable joint according to claim 5, wherein the first member comprises one or more v-shaped grooves configured to receive the shaft of the second member.

7. A moveable joint according to claim 6, wherein the first member comprises a v-shaped groove at opposing ends of the first member configured to receive the shaft of the second member.

8. A moveable joint according to claim 1, wherein the first member is configured to adjust the position of the second member.

9. A moveable joint according to claim 7, wherein the first member comprises a flexible material such that opposing ends of the first member are moveable relative to a centre of the first member.

10. A moveable joint according to claim 9, wherein opposing ends of the first member are moveable relative to the centre of the first member such that the v-shaped groove at opposing ends of the first member is configured to adjust the position of the second member relative to the centre of the first member.

11. A moveable joint according to claim 1, further comprising a heating means configured to heat the shape-memory-alloy member such to change its shape.

12. A moveable joint according to claim 11, wherein the heating means extends substantially along the length of the shape-memory-alloy member.

13. A moveable joint according to claim 12, wherein the heating means comprises a wire.

14. A moveable joint according to claim 13, wherein the heating means comprises a constantan wire.

15. A moveable joint according to claim 1, wherein the biasing means comprises a spring.

16. A moveable joint according to claim 1, wherein the shape-memory-alloy member comprises a one-way shape-memory-alloy.

17. A moveable joint according to claim 1, wherein the shape-memory-alloy member comprises nitinol.

18. A satellite comprising a moveable joint according to claim 1.

19. A satellite according to claim 18, wherein the second member of the moveable joint comprises a mirror.

20. A satellite comprising a movable joint comprising:
    a first member;
    a second member moveably connected to the first member;
    a shape-memory-alloy member connected to the first member and engageable with the second member, the shape-memory-alloy member being configured to change shape when heated; and
    a biasing means configured to bias the second member from a first position relative to the first member towards a second position relative to the first member;
    wherein movement of the second member between the first position and the second position is limited by the shape-memory-alloy member such that the position of the second member relative to the first member is determined by the shape of the shape-memory-alloy member.

* * * * *